United States Patent
Marugame

(10) Patent No.: US 6,181,815 B1
(45) Date of Patent: Jan. 30, 2001

(54) SUBJECT IMAGE EXTRACTION DEVICE

(75) Inventor: Atsushi Marugame, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/030,743

(22) Filed: Feb. 25, 1998

(30) Foreign Application Priority Data

Feb. 25, 1997 (JP) .................................................. 9-040533

(51) Int. Cl.⁷ ..................................................... G06K 9/00
(52) U.S. Cl. .......................... 382/154; 382/154; 382/201; 382/291; 382/285; 348/94; 348/139; 345/419
(58) Field of Search .................................... 382/106, 154, 382/174, 201, 216, 291, 293, 285, 162; 348/94, 139; 345/419

(56) References Cited

U.S. PATENT DOCUMENTS 4,858,157 * 8/1989 Murai et al. .......................... 364/560
4,982,438 * 1/1991 Usami et al. .............................. 382/1

FOREIGN PATENT DOCUMENTS

| 7-177423 | 7/1995 | (JP) . |
| 7-220095 | 8/1995 | (JP) . |
| 8-271914 | 8/1995 | (JP) . |

* cited by examiner

*Primary Examiner*—Matthew Bella
*Assistant Examiner*—Sheela Chawan
(74) *Attorney, Agent, or Firm*—Ostrolenk, Faber, Gerb & Soffen, LLP

(57) ABSTRACT

A main image pickup section for picking up a main image and two or more subsidiary image pickup sections for picking up subsidiary images are used to shoot a subject. A 3-D object on which a predetermined pattern is drawn is also shot by the same image pickup sections, and parameters representing relative positions and attitudes of the image pickup sections are obtained using the images of the 3-D object. Feature points are extracted from each of the main image and the subsidiary images, and 3-D coordinates corresponding to each feature point in the main image are determined using the parameters and the feature points in the subsidiary images. Subsequently, judgment is executed and each of the feature points in the main image is accepted if the 3-D coordinates is within a designated 3-D space domain. Subsequently, subject outline points are extracted from the accepted feature points. Then, part of the main image which is surrounded by the subject outline points is extracted as the subject image. According to the device, subject image extraction can be extracted with high accuracy, without information of the subject or the image pickup device, without control or measurement of the positions of the image pickup devices, and with easy setting of a threshold value.

14 Claims, 6 Drawing Sheets

FIG. 2
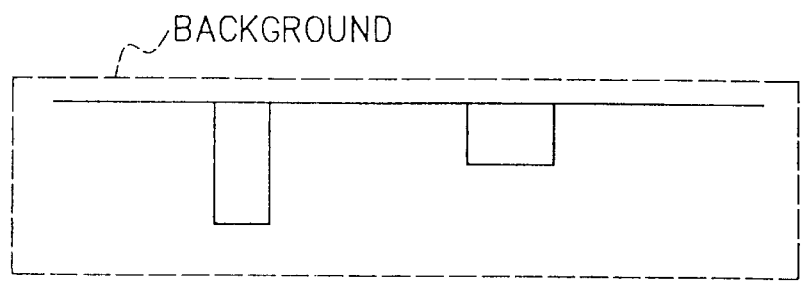
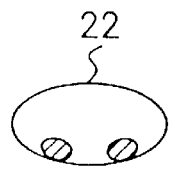
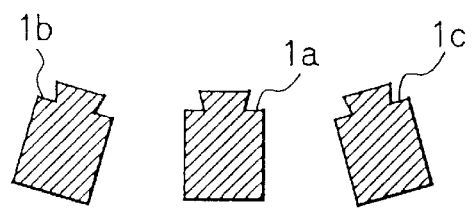
FIG. 3
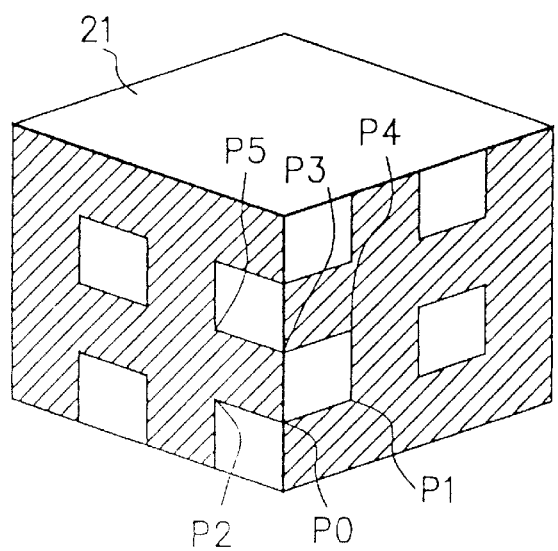

IMAGE 20a

IMAGE 20b

F I G. 6
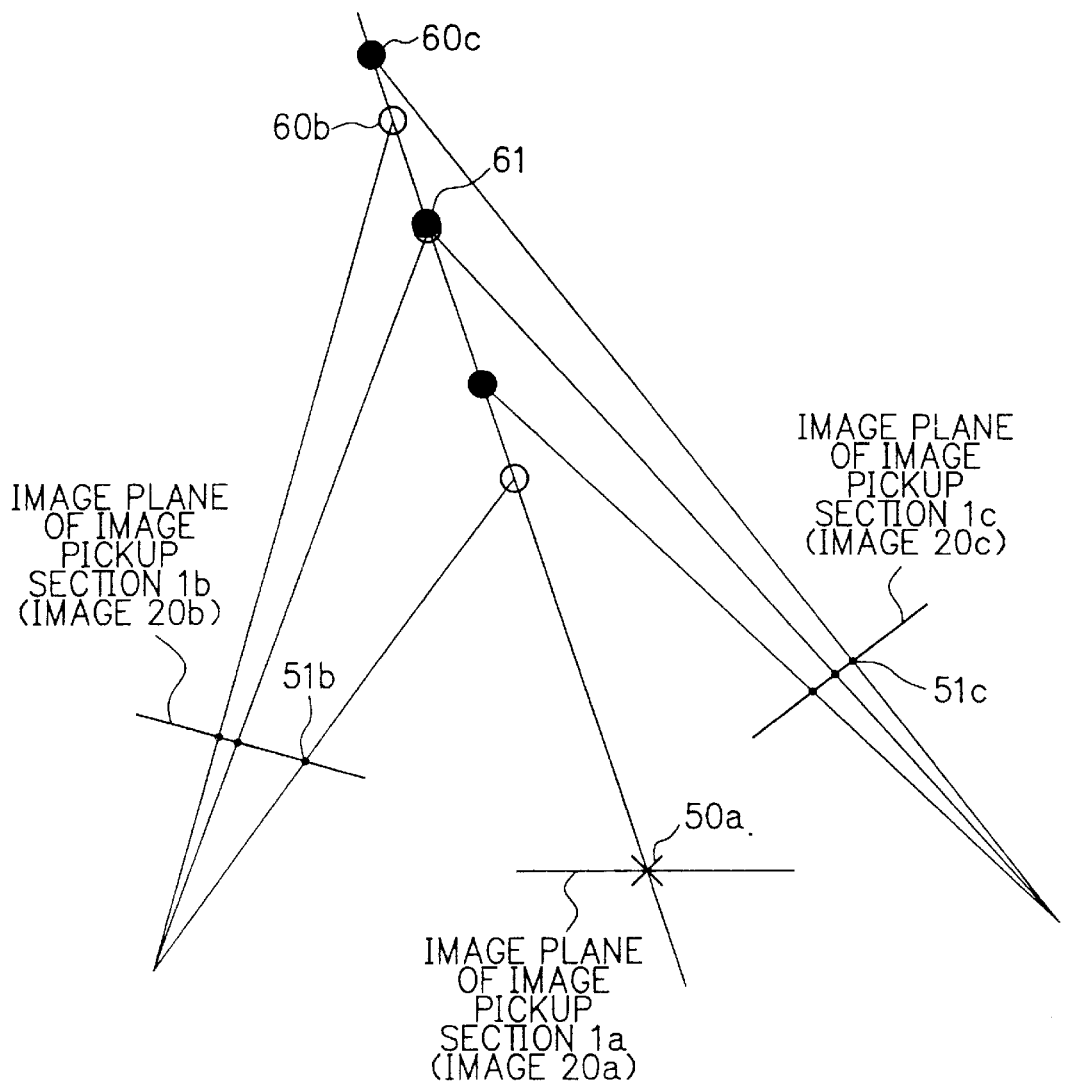

F I G. 7
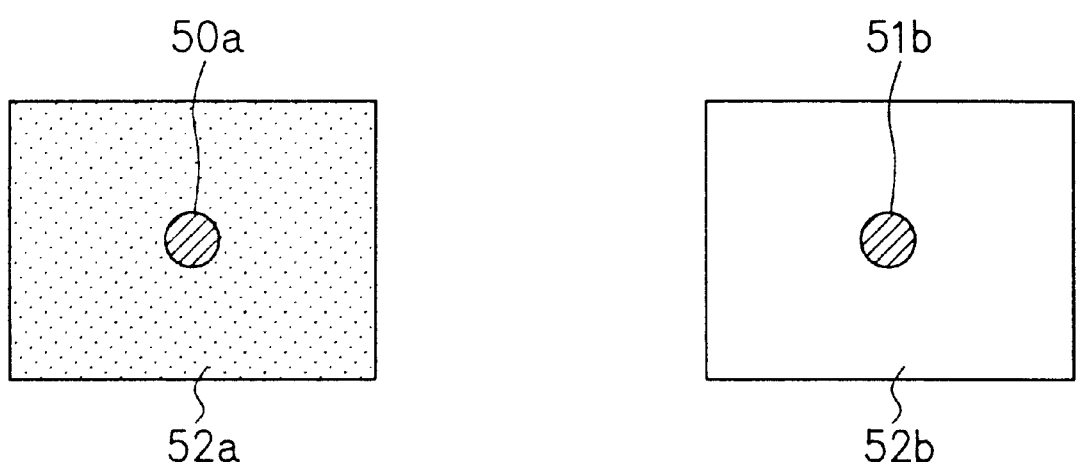

SUBJECT IMAGE EXTRACTION DEVICE

BACKGROUND OF THE INVENTION

The present invention relates to a subject image extraction device for extracting an image of a desired subject from an inputted image, and in particular, to a subject image extraction device which can extract an image of a subject which existed in a designated 3-D space domain at the moment of shooting.

DESCRIPTION OF THE PRIOR ART

Various kinds of methods are proposed for extracting an image of a desired subject or object from an inputted image, such as a method utilizing prestored information concerning the subject as disclosed in Japanese Patent Application Laid-Open No.HEI7-220095 (hereafter, referred to as 'document No.1'), a method utilizing two or more image pickup devices (cameras) as disclosed in Japanese Patent Application Laid-Open No.HEI7-177423 (hereafter, referred to as 'document No.2') and Japanese Patent Application No.HEI8-271914 (hereafter, referred to as 'document No.3'), etc.

In the method utilizing prestored subject information which is disclosed in the document No.1, information concerning the image pickup device such as the focal length of the image pickup device, the size of a pixel of a sensor of the image pickup device, the number of pixels of the sensor, etc. and information concerning the subject such as the size of the subject, the distances between the center point on the subject and parts of the subject, etc. are preliminarily recorded and stored in a storage unit. Then, the size of the subject in the image which has been picked up by the image pickup device is estimated using the information concerning the image pickup device and the subject. Meanwhile, a plurality of parts of the image which are considered to be candidates of the image of the subject are extracted from the image. Then, it is judged whether each of the candidate parts is the genuine subject image or not, by comparing the size of the candidate part with the estimated size of the subject in the image. And one candidate part whose size is the nearest to the estimated size of the subject in the image is extracted as the image of the subject.

In the method utilizing two or more image pickup devices which is disclosed in the document No.2, corresponding points in each image which have been picked up by the two or more image pickup devices are searched for, and disparities between the images with regard to the corresponding points are obtained using the difference of coordinates between the corresponding points in each image. Then, part of an image whose disparity between the images are large (i.e. parts which existed in the foreground near to the image pickup devices at the moment of shooting) are extracted as the image of the subject.

In the method utilizing two or more image pickup devices which is disclosed in the document No.3. The subject is shot in the centers of images by the two or more image pickup devices, and the aforementioned search of point correspondence (hereafter, referred to as 'point correspondence search') is executed from the center of the images. Then, outline point judgment (i.e. judgment whether a point in an image is a point on the outline of the subject or not) is executed using 3-D coordinates (corresponding to the point) which are calculated using the corresponding points obtained by the point correspondence search, and the outline points are used for extraction of the subject image. Even when false correspondence occurred in the point correspondence search and parts of the outline points dropped out from the extraction, such parts are restored by means of outline restoration assuming continuity.

However, in the method disclosed in the document No.1, the aforementioned information concerning the subject such as the size of the subject, the distances between the center point on the subject and parts of the subject, etc. and the information concerning the image pickup device such as the focal length of the image pickup device, the size of a pixel, the number of pixels, the distance between the subject and the image pickup device, etc. are needed to be prepared, and thus images of subjects whose information have not been prepared are impossible to be extracted from the image which has been picked up by the image pickup device. Further, according to the method, either the distance between the center point on the subject and part of the subject or the distance between the principle point of the image and part of the image is necessary as the information. In the case where the former distance is used, expensive devices such as an infrared irradiation unit etc. are necessary for obtaining the distance. And in the case where the latter distance is used, methods such as autofocusing, which does not operate stably under insufficient shooting conditions such as poor lighting etc., have to be employed, and thus stable extraction of the subject image is difficult.

In the method utilizing two or more image pickup devices and judging the depth using the disparity, the accuracy of subject image extraction is highly dependent on setting of a threshold value (in disparity) which is used to distinguish between the background and the foreground, and the setting of the disparity threshold value for accurate subject image extraction is very difficult for the operator of the subject image extraction device since the disparity is not a value which can be directly measured. The method of the document No.2 tries to resolve the problem by obtaining 3-D coordinates using the disparities. However, the method needs troublesome control or measurement of relative positions of the two or more image pickup devices, angles between the optical axes of the image pickup devices, etc. Further, according to the method, when false correspondence occurred in the point correspondence search, the part where the false correspondence occurred is extracted as noise, or in other words, parts of the subject image drop out.

In the method disclosed in the document No.3, the aforementioned problem concerning the difficulty of the threshold value determination is resolved by calculating 3-D coordinates without using the disparities, in which parameters which represent relative positions of the image pickup devices and angles between the optical axes of the image pickup devices are calculated using images of a predetermined pattern picked up by the image pickup devices, instead of controlling or measuring the relative positions of the image pickup devices and angles between the optical axes of the image pickup devices. Further, with regard to the aforementioned problem concerning the point correspondence search, error rate in the point correspondence search is reduced in the method of the document No.3, by shooting the subject in the centers of the images by the image pickup devices and executing the point correspondence search starting from the center of the images with high priority. Furthermore, even in the case where the false correspondence occurred in the point correspondence search, parts which have dropped out from the extraction or parts which have been incorrectly extracted are corrected by the outline restoration on the assumption of continuity. However, according to the method, all the image pickup devices have to be correctly controlled to shoot the subject in the centers of images. Further, in the case where the background has a complex scene, error rate in the point correspondence search increases and thus the outline restoration is necessitated to be executed considerably oftener, causing difficulty in the subject image extraction especially when the subject has a complex outline.

SUMMARY OF THE INVENTION

It is therefore the primary object of the present invention to provide a subject image extraction device by which an image of a desired subject can be extracted from an inputted image, without needing preparation of the information concerning the subject or the image pickup device.

Another object of the present invention is to provide a subject image extraction device by which an image of a desired subject can be extracted from an inputted image, with easy setting of a threshold value for distinguishing between the background and the foreground.

Another object of the present invention is to provide a subject image extraction device by which an image of a desired subject can be extracted from an inputted image, without needing precise control or measurement of the positions and attitudes of image pickup devices.

Another object of the present invention is to provide a subject image extraction device by which 3-D coordinates corresponding to a point in an inputted image can be accurately obtained and thereby subject image extraction can be executed with higher accuracy.

In accordance with the present invention, there is provided a subject image extraction device comprising an image storage means, a feature point extraction means, a parameter calculation means, a 3-D coordinates calculation means, a 3-D coordinates determination means, a judgment means, an outline point extraction means, and a subject extraction means. The image storage means includes main image storage section for storing images which have been picked up by a main image pickup section for picking up a main image from which an image of a subject is extracted, and two or more subsidiary image storage sections for storing images which have been picked up by two or more subsidiary image pickup sections for picking up subsidiary images to be referred to in subject image extraction. The feature point extraction means includes three or more feature point extraction sections for extracting feature point coordinates in the images which have been stored in each of the image storage sections. The parameter calculation means calculates parameters which represent relative positions and attitudes of the main image pickup section and the subsidiary image pickup sections, using the feature point coordinates in the images of a 3-D object on which a predetermined pattern is drawn which have been picked up by the main image pickup section and the subsidiary image pickup sections. The 3-D coordinates calculation means includes two or more 3-D coordinates calculation sections for calculating 3-D candidate coordinates which are considered to correspond to the feature point coordinates of a feature point in the main image, using the feature point coordinates in the main image, the feature point coordinates in the subsidiary images, and the parameters obtained by the parameter calculation means. The 3-D coordinates determination means determines genuine 3-D coordinates which correspond to the feature point in the main image, using the 3-D candidate coordinates calculated by the 3-D coordinates calculation sections in the 3-D coordinates calculation means. The judgment means judges whether or not the genuine 3-D coordinates corresponding to the feature point in the main image is in a designated 3-D space domain, and accepts the feature point if the genuine 3-D coordinates corresponding to the feature point is judged to be in the designated 3-D space domain. The outline point extraction means extracts subject outline points from a plurality of feature points which have been accepted by the judgment means. And the subject extraction means extracts part of the main image which is surrounded by the subject outline points as the subject image.

Preferably, the feature point extraction sections in the feature point extraction means extract edge-like parts in the images where large changes occur in color intensity or luminance as the feature point coordinates, in the extraction of the feature point coordinates from the main image or the subsidiary images.

Preferably, the parameter calculation means calculates eleven or more parameters per one image pickup section.

Preferably, the 3-D coordinates determination means determines the genuine 3-D coordinates by selecting a group of 3-D coordinates from each of the 3-D candidate coordinates calculated by each of the 3-D coordinates calculation sections so that the sum of distances between the 3-D coordinates included in the group will become the smallest and defining the genuine 3-D coordinates by the average of the 3-D coordinates included in the group.

Preferably, the subject image extraction device further comprises an image pickup means including the main image pickup section and the two or more subsidiary image pickup sections.

Preferably, the subject image extraction device further comprises a subject display means for displaying the part of the main image which has been extracted by the subject extraction means.

Preferably, the number of the image pickup sections is three.

In accordance with another aspect of the present invention, there is provided a subject image extraction device comprising an image storage means, a feature point neighborhood extraction means, a parameter calculation means, a corresponding point determination means, a 3-D coordinates calculation means, a 3-D coordinates determination means, a judgment means, an outline point extraction means, and a subject extraction means. The image storage means includes main image storage section for storing images which have been picked up by a main image pickup section for picking up a main image from which an image of a subject is extracted, and two or more subsidiary image storage sections for storing images which have been picked up by two or more subsidiary image pickup sections for picking up subsidiary images to be referred to in subject image extraction. The feature point neighborhood extraction means includes three or more feature point neighborhood extraction sections for extracting feature point coordinates in the images which have been stored in each of the image storage sections and extracting color/luminance information of pixels in the neighborhood of the feature point coordinates. The parameter calculation means calculates parameters which represent relative positions and attitudes of the main image pickup section and the subsidiary image pickup sections, using the feature point coordinates in the images of a 3-D object on which a predetermined pattern is drawn which have been picked up by the main image pickup section and the subsidiary image pickup sections. The corresponding point determination means includes two or more corresponding point determination sections for selecting a group of candidate corresponding points in the subsidiary image which are considered to correspond to the feature point in the main image, from the feature points in the subsidiary images, using the feature point coordinates in the main image and the subsidiary image and the color/luminance information of pixels in the neighborhood of the feature point coordinates which have been extracted by the feature point neighborhood extraction means.

The 3-D coordinates calculation means includes two or more 3-D coordinates calculation sections for calculating 3-D candidate coordinates which are considered to correspond to a feature point in the main image, using the feature point coordinates in the main image, the group of candidate corresponding points, and the parameters obtained by the parameter calculation means. The 3-D coordinates determination means determines genuine 3-D coordinates which correspond to the feature point in the main image, using the 3-D candidate coordinates calculated by the 3-D coordinates calculation sections in the 3-D coordinates calculation means.

The judgment means judges whether or not the genuine 3-D coordinates corresponding to the feature point in the main image is in a designated 3-D space domain, and accepts the feature point if the genuine 3-D coordinates corresponding to the feature point is judged to be in the designated 3-D space domain. The outline point extraction means extracts subject outline points from a plurality of feature points which have been accepted by the judgment means. And the subject extraction means extracts part of the main image which is surrounded by the subject outline points as the subject image.

Preferably, the feature point neighborhood extraction sections in the feature point extraction means extract edge-like parts in the images where sudden changes occur in color intensity or luminance as the feature point coordinates, in the extraction of the feature point coordinates from the main image or the subsidiary images.

Preferably, the parameter calculation means calculates eleven or more parameters per one image pickup section.

Preferably, the 3-D coordinates determination means determines the genuine 3-D coordinates by selecting a group of 3-D coordinates from each of the 3-D candidate coordinates calculated by each of the 3-D coordinates calculation sections so that the sum of distances between the 3-D coordinates included in the group will become the smallest and defining the genuine 3-D coordinates by the average of the 3-D coordinates included in the group.

Preferably, the subject image extraction device further comprises an image pickup means including the main image pickup section and the two or more subsidiary image pickup sections.

Preferably, the subject image extraction device further comprises a subject display means for displaying the part of the main image which has been extracted by the subject extraction means.

Preferably, the number of the image pickup sections is three.

BRIEF DESCRIPTION OF THE DRAWINGS

The objects and features of the present invention will become more apparent from the consideration of the following detailed description taken in conjunction with the accompanying drawings, in which:

FIG. 2 is a schematic diagram showing preferred arrangement of image pickup sections 1a, 1b and 1c of the subject image extraction device of FIG. 1;

FIG. 3 is a perspective view showing an example of a 3-D object on which a predetermined pattern is drawn which is used in the embodiment of FIG. 1;

FIG. 6 is a schematic diagram showing a 3-D coordinates determination process of the subject image extraction device of FIG. 1;

FIG. 7 is a schematic diagram explaining 'block matching' used in the embodiment of FIG. 8.

DESCRIPTION OF THE PREFERRED EMBODIMENTS

Figure 1:
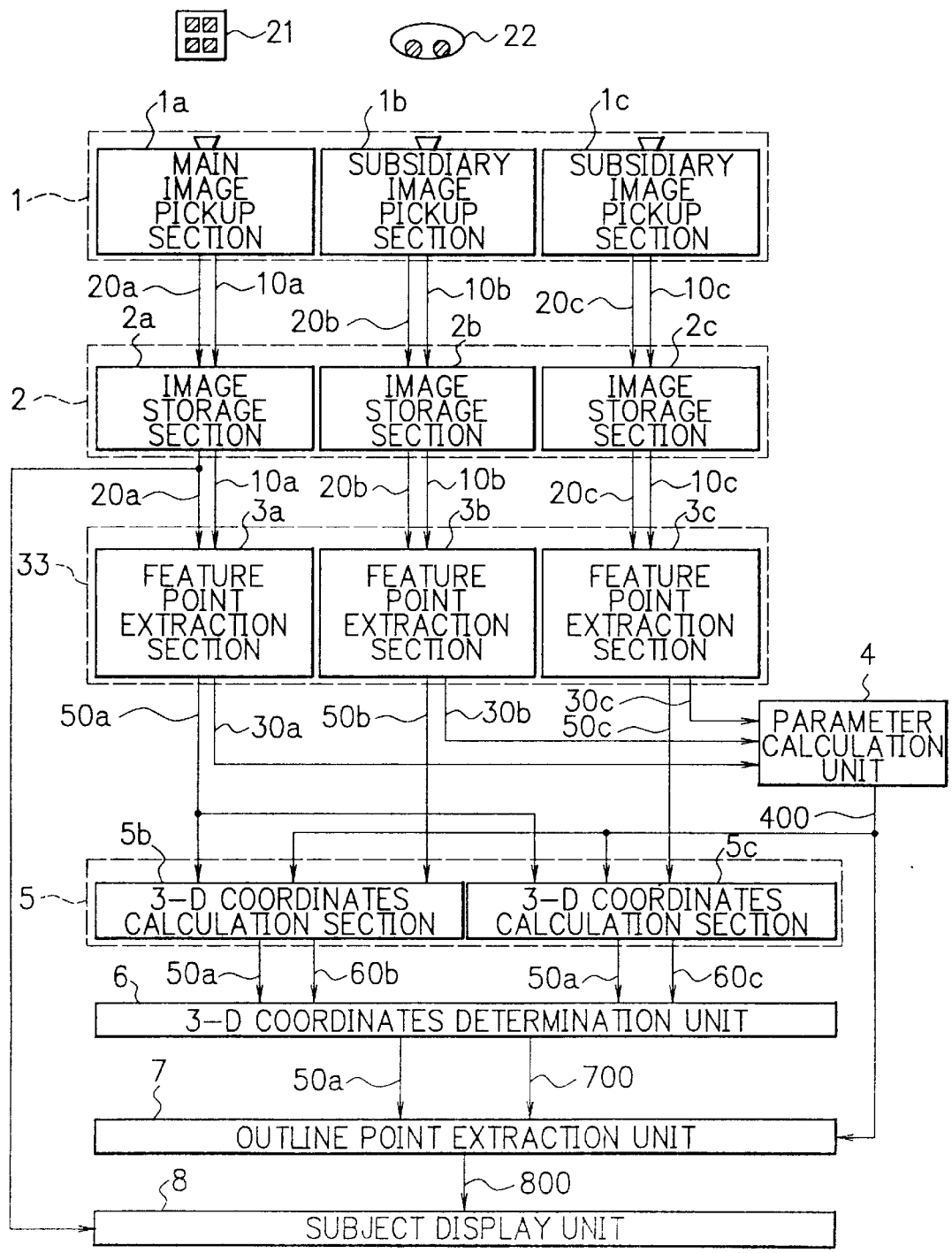
FIG. 1 is a block diagram showing a subject image extraction device according to an embodiment of the present invention.

Referring now to the drawings, a description will be given in detail of preferred embodiments in accordance with the present invention.

FIG. 1 is a block diagram showing a subject image extraction device according to an embodiment of the present invention.

The subject image extraction device of FIG. 1 comprises an image pickup unit 1, an image storage unit 2, a feature point extraction unit 3, a parameter calculation unit 4, a 3-D coordinates calculation unit 5, a 3-D coordinates determination unit 6, an outline point extraction unit 7, and a subject display unit 8.

The image pickup unit 1 is composed of an image pickup section 1a for picking up a main image to be mainly used in a subject image extraction process which will be described below, and image pickup sections 1b and 1c for picking up subsidiary images to be referred to in the subject image extraction process. The image pickup sections 1a, 1b and 1c are preliminarily used to shoot a 3-D object 21 on which a predetermined pattern is drawn in order to obtain parameters 400 which will be described below, and are used to shoot a subject 22 whose image will be extracted using the parameters 400 etc.

The image storage unit 2 is composed of image storage sections 2a, 2b and 2c. The image storage sections 2a, 2b and 2c store images 10a, 10b and 10c of the 3-D object 21 and images 20a, 20b and 20c of the subject 22 which have been picked up by the image pickup sections 1a, 1b and 1c, respectively.

The feature point extraction unit 3 is composed of feature point extraction sections 3a, 3b and 3c. The feature point extraction sections 3a, 3b and 3c extract coordinates 30a, 30b and 30c of a plurality of feature points from the images 10a, 10b and 10c which have been stored in the image storage sections 2a, 2b and 2c respectively, and extract coordinates 50a, 50b and 50c of a plurality of feature points from the images 20a, 20b and 20c which have been stored in the image storage sections 2a, 2b and 2c respectively.

The parameter calculation unit 4 calculates and stores the parameters 400 which represent relative positions and attitudes of the main image pickup section 1a and the subsidiary image pickup sections 1b and 1c, using the feature point coordinates 30a, 30b and 30c which have been extracted by the feature point extraction sections 3a, 3b and 3c respectively.

The 3-D coordinates calculation unit 5 is composed of 3-D coordinates calculation sections 5b and 5c. The 3-D coordinates calculation section 5b calculates 3-D candidate coordinates 60b using the parameters 400 and the feature point coordinates 50a and 50b which have been extracted by the feature point extraction sections 3a and 3b. The 3-D coordinates calculation section 5c calculates 3-D candidate coordinates 60c using the parameters 400 and the feature point coordinates 50a and 50c which have been extracted by the feature point extraction sections 3a and 3c. Incidentally, the 3-D candidate coordinates 60b is a group of 3-D coordinates (i.e. a group of 3-D vectors each of which is representing 3-D coordinates) which are considered to be candidates for genuine 3-D coordinates which correspond to the feature point (2-D) coordinates 50a in the main image 20a which have been extracted by the feature point extraction section 3a. Similarly, the 3-D candidate coordinates 60c is a group of 3-D coordinates (i.e. a group of 3-D vectors each of which is representing 3-D coordinates) which are considered to be candidates for genuine 3-D coordinates which correspond to the feature point (2-D) coordinates 50a in the main image 20a which have been extracted by the feature point extraction section 3a.

The 3-D coordinates determination unit 6 determines genuine 3-D coordinates 700 which correspond to the feature point coordinates 50a in the main image 20a, using the 3-D candidate coordinates 60b and the 3-D candidate coordinates 60c.

The outline point extraction unit 7 judges whether the feature point 50a is a point in the subject 22 or not, using the 3-D coordinates 700, and extracts subject outline point coordinates 800. Here, the subject outline point coordinates 800 is a group of 2-D coordinates (i.e. a group of 2-D vectors each of which is representing 2-D coordinates) which correspond to a plurality of subject outline points (i.e. feature points 50a which exist on the outline of the subject 22).

The subject display unit 8 displays part of the image 20a which are surrounded by the subject outline points, using the subject outline point coordinates 800 extracted by the outline point extraction unit 7.

The feature point extraction unit 3, the parameter calculation unit 4, the 3-D coordinates calculation unit 5, the 3-D coordinates determination unit 6, and the outline point extraction unit 7 are realized, for example, by a microprocessor unit which is composed of a CPU, ROM (Read Only Memory), RAM (Random Access Memory), etc., and necessary software. The image storage unit 2 is realized by one or more storage devices such as an HDD (Hard Disk Drive), an MO (Magneto-Optical disk), etc. The subject display unit 8 is realized, for example, by a display unit such as an LCD (Liquid Crystal Display), etc. and a microprocessor unit.

In the following, the operation of the subject image extraction device of FIG. 1 will be described, in which both a point itself and coordinates of the point are expressed by the same word 'point' for brevity.

In this embodiment, the parameters 400 which represent relative positions and attitudes of the image pickup sections 1a, 1b and 1c are needed to be calculated by the parameter calculation unit 4 first of all, using the coordinates 30a, 30b and 30c of the feature points in the images 10a, 10b and 10c of the 3-D object 21.

For the calculation of the parameters 400, the image pickup sections 1a, 1b and 1c respectively pick up images 10a, 10b and 10c of the 3-D object 21 on which a predetermined pattern (which is shown in FIG. 3, for example) is drawn.

The optical axes of the image pickup sections 1a, 1b and 1c may be parallel, or may have convergence angles between them. Referring to FIG. 2, the main image pickup section 1a, for picking up the main image 10a is placed in the middle of the three image pickup sections 1a, 1b and 1c. Such arrangement is advantageous since occlusion can be made smaller.

The images 10a, 10b and 10c of the 3-D object 21 on which the predetermined pattern is drawn picked up by the image pickup sections 1a, 1b and 1c are stored in the image storage sections 2a, 2b and 2c respectively, and then supplied to the feature point extraction sections 3a, 3b and 3c in the feature point extraction unit 3, respectively.

After the images 10a, 10b and 10c are supplied to the feature point extraction unit 3, six or more feature points P0, P1, P2, P3, P4, P5, . . . are chosen so that all the feature points will not be in one plane of the 3-D object 21, more concretely, so that a 3-D coordinate system can be at least generated using four points out of the six or more feature points P0, P1, P2, P3, P4, P5, . . . Subsequently, coordinates 30a, 30b and 30c of the feature points P0, P1, P2, P3, P4, P5, . . . in the images 10a, 10b and 10c are extracted by the feature point extraction sections 3a, 3b and 3c, respectively. Here, each of the coordinates 30a, 30b and 30c is a group of 2-D coordinates (corresponding to the feature points P0, P1, P2, P3, P4, P5, . . . ) in the image 10a, 10b, 10c, respectively. The choice of the feature points can be done by various kinds of methods, for example, by instruction of the operator of the device who is watching the images 10a, 10b and 10c, or by automatic extraction by means of image processing such as pattern matching etc.

Then, the parameter calculation unit 4 calculates the parameters 400 using the coordinates 30a, 30b and 30c of the feature points P0, P1, P2, P3, P4, P5, . . . , and the calculated parameters 400 are stored in the parameter calculation unit 4.

The calculation of the parameters 400 can be executed based on a method which is disclosed in Japanese Patent Application No.HEI7-206932. In the following, the method for the calculation of the parameters 400 will be described.

First, a 3-D coordinate system is defined so that coordinates of the feature points P0, P1, P2 and P3 (shown in FIG. 3) in the 3-D coordinate system will be (0, 0, 0), (1, 0, 0), (0, 1, 0) and (0, 0, 1) respectively. Here, the 3-D coordinate system is not needed to be a rectangular coordinate system with rectangular axes as is defined by the P0, P1, P2 and P3 which are shown in FIG. 3, and generally, the 3-D coordinate system may be an oblique coordinate system which is defined by feature points P0, P1, P2 and P3 which exist on oblique axes. Hereafter, coordinates of the feature points P4 and P5 in the 3-D coordinate system will be expressed as $(X_4, Y_4, Z_4)$ and $(X_5, Y_5, Z_5)$ respectively.

Incidentally, 2-D coordinates of the feature points P0, P1, P2, P3, P4 and P5 in the image 10a will be hereafter expressed as $$(u_i^c, v_i^c)(i=0, \ldots, 5),$$

and coordinates of the feature points P0, P1, P2, P3, P4 and P5 in the image 10b will be hereafter expressed as $$(u_i^l, v_i^l)(i=0, \ldots, 5),$$

and coordinates of the feature points P0, P1, P2, P3 P4 and P5 in the image 10c will be hereafter expressed as $$(u_i', v_i')(i=0,\ldots,5),$$

Here, using the coordinates:

$$(u_i^c, v_i^c),$$

of the feature points in the image 10a and the 3-D coordinates $(X_k, Y_k, Z_k)$ (k=4, 5) of the feature points P4 and P5, and using the following parameters:

$$c_j^c(j=1,\ldots,3),$$

which represent the attitude of the main image pickup section 1a, the following equations (1), (2), (3) and (4) are derived.

$$\{X4(u_4^c-u_1^c)\}c_1^c+\{Y4(u_4^c-u_2^c)\}c_2^c+\{Z4(u_4^c-u_3^c)\}c_3^c=(1-X4-Y4-Z4)(u_0^c-u_4^c) \quad (1)$$

$$\{X4(v_4^c-v_1^c)\}c_1^c+\{Y4(v_4^c-v_2^c)\}c_2^c+\{Z4(v_4^c-v_3^c)\}c_3^c=(1-X4-Y4-Z4)(v_0^c-v_4^c) \quad (2)$$

$$\{X5(u_5^c-u_1^c)\}c_1^c+\{Y5(u_5^c-u_2^c)\}c_2^c+\{Z5(u_5^c-u_3^c)\}c_3^c=(1-X5-Y5-Z5)(u_0^c-u_5^c) \quad (3)$$

$$\{X5(v_5^c-v_1^c)\}c_1^c+\{Y5(v_5^c-v_2^c)\}c_2^c+\{Z5(v_5^c-v_3^c)\}c_3^c=(1-X5-Y5-Z5)(v_0^c-v_5^c) \quad (4)$$

The above parameters:

$$c_j^c(j=1,\ldots,3),$$

are elaborated on in A. Marugame et al., "Structure Recovery from Scaled Orthographic and Perspective Views," Proceedings IEEE ICIP-96, vol.2, pp.851–854 (1996), and are representing the strain (extension/contraction) of three axes of the 3-D coordinate system due to projection of the 3-D coordinate system onto 2-D plane by the image pickup section 1a. The parameters can be obtained from the equations (1), (2), (3) and (4), using, for example, method of least squares, which is described for example in a document: K. Kanatani, "Image understanding", Morikita Shuppan, Japan (1990).

Parameters:

$$c_j^l(j=1,\ldots,3),$$

which represent the attitude of the subsidiary image pickup section 1b and parameters:

$$c_j^r(j=1,\ldots,3),$$

which represent the attitude of the subsidiary image pickup section 1c can be obtained by the same method as the case of the main image pickup section 1a.

The parameters:

$$c_j^c, c_j^l, c_j^r(j=1,\ldots,3),$$

which have been obtained by the above calculation and the following coordinates:

$$(u_i^c,v_i^c), (u_i^l,v_i^l), (u_i^r,v_i^r)(i=0,\ldots,3),$$

are stored in the parameter calculation unit 4 as the parameters 400. Here, the number of parameters included in the parameters 400 per one image pickup section (1a, 1b or 1c) is 11. It is generally known that 11 parameters per one image pickup device are enough for expressing relative positions and attitudes of a plurality of image pickup devices.

Now that the parameters 400 representing relative positions and attitudes of the image pickup sections 1a, 1b and 1c have been obtained and stored in the parameter calculation unit 4, extraction of desired subject in the main image 20a can be executed. In the following, the subject image extraction process will be described in detail.

The subject 22 is shot by the image pickup sections 1a, 1b and 1c of the image pickup unit 1 and images 20a, 20b and 20c are obtained respectively.

The images 20a, 20b and 20c are stored in the image storage sections 2a, 2b and 2c of the image storage unit 2, respectively.

From the images 20a, 20b and 20c which have been stored in the image storage sections 2a, 2b and 2c respectively, feature point coordinates 50a, 50b and 50c are respectively extracted by the feature point extraction sections 3a, 3b and 3c of the feature point extraction unit 3.

The extraction of the feature points may be done by various kinds of methods, for example, by instruction of the operator of the device who is watching the images 20a, 20b and 20c, or by automatic extraction using differential filters such as Sobel filter, Laplacian filter, etc. The extraction of feature points 50a are usually executed in units of pixels in the main image 20a. In the case where differential filters are utilized for the aforementioned automatic extraction of the feature points 50a, edge-like parts in the main image 20a where large changes occur in color intensity (in cases of color image) or luminance (in cases of black and white image) are extracted as the feature points 50a, and thereby a few of all the pixels in the main image 20a are extracted as the feature points 50a by the feature point extraction section 3a, for example. The same goes for the extraction of feature points 50b and 50c from the images 20b and 20c.

A plurality of feature points 50a are extracted one after another by the feature point extraction section 3a in the feature point extraction unit 3, and each feature point 50a will be adopted as being a point on the outline of the subject 22 (i.e. adopted as a 'subject outline point') or rejected as not being a subject outline point, by the processes which will be described below. Finally, a group of subject outline points which are obtained as above will be used for extraction of the subject image.

The 3-D coordinates calculation section 5b in the 3-D coordinates calculation unit 5 calculates the 3-D candidate coordinates 60b using the parameters 400 and the feature points 50a and 50b, and the 3-D coordinates calculation section 5c calculates the 3-D candidate coordinates 60c using the parameters 400 and the feature points 50a and 50c. As mentioned above, the 3-D candidate coordinates 60b are a group of 3-D coordinates (i.e. a group of 3-D vectors each of which is representing 3-D coordinates) which are considered to be candidates for genuine 3-D coordinates which correspond to the feature point (2-D) coordinates 50a in the main image 20a which have been extracted by the feature point extraction section 3a, and the 3-D candidate coordinates 60c is a group of 3-D coordinates (i.e. a group of 3-D vectors each of which is representing 3-D coordinates) which are considered to be candidates for genuine 3-D coordinates which correspond to the feature point (2-D) coordinates 50a in the main image 20a which have been extracted by the feature point extraction section 3a.

In the following, the operation of the 3-D coordinates calculation section 5b will be described in detail.

Figure 4A:
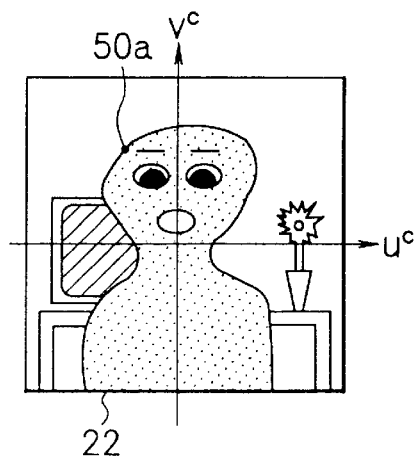
FIG. 4A is a schematic diagram showing a main image used in the embodiment of FIG. 1.
Figure 4B:
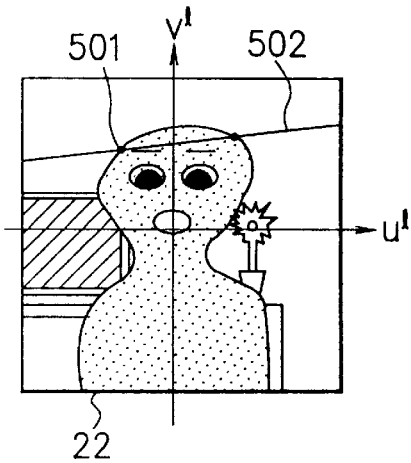
FIG. 4B is a schematic diagram showing a subsidiary image used in the embodiment of FIG. 1.

The 3-D coordinates calculation section 5b chooses one of the feature points 50a one after another, and the following processes are executed to each of the feature points 50a. When 2-D coordinates of the feature point 50a in the image 20a is expressed as $(u^c, v^c)$ as shown in FIG. 4A, the position of a feature point 501 in the image 20b which corresponds to the feature point 50a in the image 20a is restricted on a line 502 shown in FIG. 4B (which is called an epipolar line). The epipolar line 502 is determined according to the relation between the positions of the image pickup sections 1a and 1b. Therefore, the 3-D coordinates calculation section 5b calculates the epipolar line 502 using the following parameters which are included in the parameters 400.

i $c_j^c, c_j^l (j=1,\ldots,3), (u_i^c, v_i^c), (u_i^l, v_i^l)(i=0,\ldots,3)$,

The calculation of the epipolar line 502 can be executed according to the aforementioned document No.3 or a document: The proceedings of the 1st Image Media Processing Symposium (1996), pages 15–16, as follows.

First, using the parameters:

$(u_i^c, v_i^c)(i=0,\ldots,3), c_j^c(j=1,\ldots,3), (u^c, v^c)$, the following primary intermediate parameters $t_{11}, t_{12}, t_{13}, t_{21}, t_{22}, t_{23}, d_1$ and $d_2$ are obtained.

$$t11 = \{c_1^c(u^c - u_1^c) - (u^c - u_0^c)\} \quad (5)$$

$$t12 = \{c_2^c(u^c - u_2^c) - (u^c - u_0^c)\} \quad (6)$$

$$t13 = \{c_3^c(u^c - u_3^c) - (u^c - u_0^c)\} \quad (7)$$

$$t21 = \{c_1^c(v^c - v_1^c) - (v^c - v_0^c)\} \quad (8)$$

$$t22 = \{c_2^c(v^c - v_2^c) - (v^c - v_0^c)\} \quad (9)$$

$$t23 = \{c_3^c(v^c - v_3^c) - (v^c - v_0^c)\} \quad (10)$$

$$d1 = u_0^c - u^c \quad (11)$$

$$d2 = v_0^c - v^c \quad (12)$$

Subsequently, using the primary intermediate parameters $t_{11}, t_{12}, t_{13}, t_{21}, t_{22}, t_{23}, d_1$ and $d_2$ and the following parameters:

$(U_i^l, V_i^l)(i=0,\ldots,3), C_j^l(j=1,\ldots,3)$, the following secondary intermediate parameters $U_0, U_1, V_0, V_1, S_0$ and $S_1$ are obtained.

$$U_0 = u_0^l(t_{11}t_{22} - t_{12}t_{21}) + (c_1^l u_1^l - u_0^l)(t_{22}d_1 - t_{12}d_2) + (c_2^l u_2^l - u_0^l)(t_{11}d_2 - t_{21}d_1) \quad (13)$$

$$U_1 = (c_1^l u_1^l - u_0^l)(t_{12}t_{23} - t_{13}t_{22}) + (c_2^l u_2^l - u_0^l)(t_{13}t_{21} - t_{11}t_{23}) + (c_3^l u_3^l - u_0^l)(t_{11}t_{22} - t_{12}t_{21}) \quad (14)$$

$$V_0 = U_0^l(t_{11}t_{22} - t_{12}t_{21}) + (c_1^l V_1^l - V_0^l)(t_{22}d_1 - t_{12}d_2) + (c_2^l v_2^l - v_0^l)(t_{11}d_2 - t_{21}d_1) \quad (15)$$

$$V_1 = (c_1^l v_1^l - v_0^l)(t_{12}t_{23} - t_{13}t_{22}) + (c_2^l v_2^l - v_0^l)(t_{13}t_{21} - t_{11}t_{23}) + (c_3^l v_3^l - v_0^l)(t_{11}t_{22} - t_{12}t_{21}) \quad (16)$$

$$S_0 = (t_{11}t_{22} - t_{12}t_{21}) + (c_1^l - 1)(t_{22}d_1 - t_{12}d_2) + (c_2^l - 1)(t_{11}d_2 - t_{21}d_1) \quad (17)$$

$$S_1 = (c_1^l - 1)(t_{12}t_{23} - t_{13}t_{22}) + (c_2^l - 1)(t_{13}t_{21} - t_{11}t_{23}) + (c_3^l - 1)(t_{11}t_{22} - t_{12}t_{21}) \quad (18)$$

Subsequently, using the secondary intermediate parameters $U_0, U_1, V_0, V_1, S_0$ and $S_1$, the parameters A, B and C of the epipolar line 502: Au+Bv+C=0 (Here, the (u, v) are 2-D coordinates in the image 20b.) are obtained by the following equations (19)–(21). As mentioned above, the epipolar line 502 is a line in the image 20b which restricts the position of the feature point 501 in the image 20b which corresponds to the feature point 50a in the image 20a.

$$A = S_1 V_0 - S_0 V_1 \quad (19)$$

$$B = -(S_1 U_0 - S_0 U_1) \quad (20)$$

$$C = U_0 V_1 - U_1 V_0 \quad (21)$$

Now that the parameters A, B and C of the epipolar line 502 have been obtained, feature points $Q_m$: $(u_m, v_m)$ (m=1, ... ) which exist in the $\epsilon_1$-neighborhood of the epipolar line 502 in the image 20b can be expressed by the following inequality.

$$\frac{|Au_m + Bv_m + C|}{\sqrt{A^2 + B^2}} < \varepsilon_1 \quad (22)$$

Incidentally, the number of the feature points $Q_m$ in the $\epsilon_1$-neighborhood of the epipolar line 502 is finite (for example, of the order of 10), since feature points $Q_m$ are usually defined in units of pixels in the image 20b. The above feature points $Q_m$: $(u_m, v_m)$ (m=1, ... ) are candidate corresponding points in the image 20b which are considered to correspond to the feature point 50a: $(u_c, v_c)$ in the image 20a.

After the feature points $Q_m$: $(u_m, v_m)$ (m=1, ... ) are obtained, the 3-D candidate coordinates 60b:

$(X_m^l, Y_m^l, Z_m^l)$ (m=1, ... ), are calculated for each pair of the feature point 50a and the feature point $Q_m$ (m=1, ... ).

The calculation of the 3-D candidate coordinates 60b:

$(X_m^l, Y_m^l, Z_m^l)$ (m=1, ... ), can be executed based on the aforementioned Japanese Patent Application No.HEI7-206932 as follows, using the feature point 50a: $(u^c, v^c)$, the feature points $Q_m$: $(u_m, v_m)$ (m=1, ... ), and the following parameters.

Figure 5:
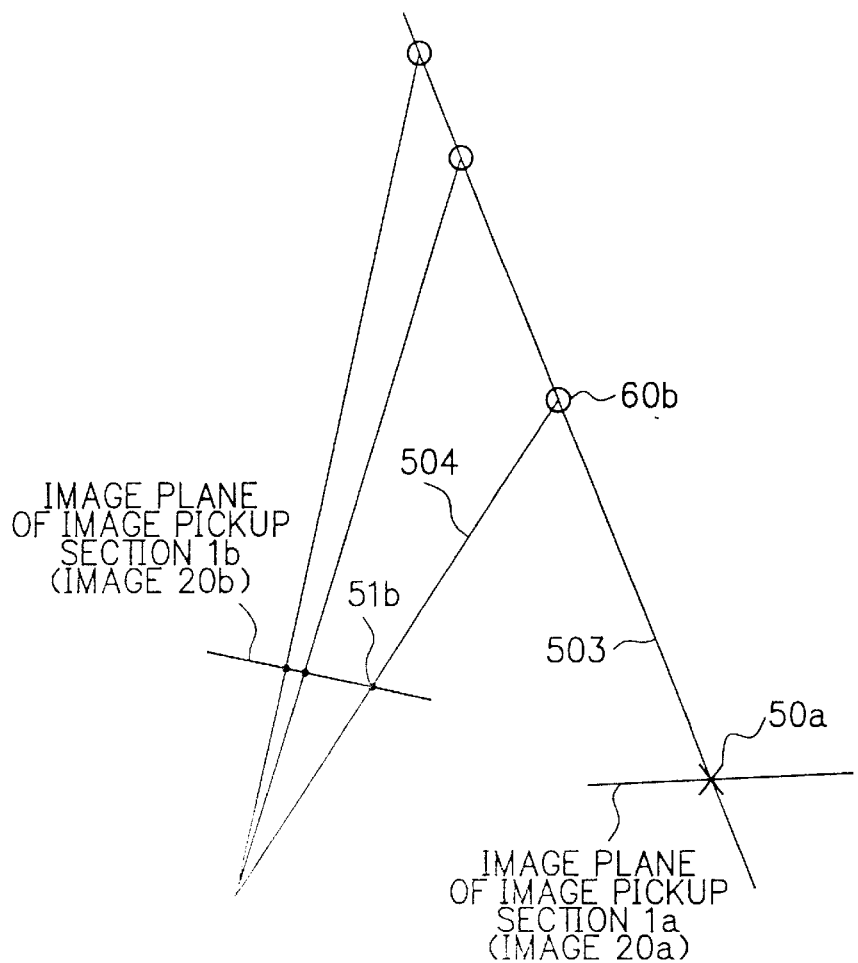
FIG. 5 is a schematic diagram showing the principle of triangular surveying.

$(u_i^c, v_i^c), (u_i^l, v_i^l)(i=0,\ldots,3), c_j^c, c_j^l(j=1,\ldots,3)$,

First, referring to FIG. 5, a set of simultaneous equations which represent a back projection line 503 of the feature point 50a $(u^c, v^c)$:

$$\{c_1^c(u^c - u_1^c) - (u^c - u_0^c)\}X_m^l + \{c_2^c(u^c - u_2^c) - (u^c - u_0^c)\}Y_m^l + \{c_3^c(u^c - u_3^c) - (u^c - u_0^c)\}Z_m^l = u_0^c - u^c \quad (23)$$

$$\{c_1^c(v^c - v_1^c) - (v^c - v_0^c)\}X_m^l + \{c_2^c(v^c - v_2^c) - (v^c - v_0^c)\}Y_m^l + \{c_3^c(v^c - v_3^c) - (v^c - v_0^c)\}Z_m^l = v_0^c - v^c \quad (24)$$

and a set of simultaneous equations which represent a back projection line 504 of the candidate corresponding point 51b $(Q_m: (u_m, v_m))$:

$$\{c_1^l(u_m - u_1^l) - (u_m - u_0^l)\}X_m^l + \{c_2^l(u_m - u_2^l) - (u_m - u_0^l)\}Y_m^l + \{c_3^l(u_m - u_3^l) - (u_m - u_0^l)\}Z_m^l = u_0^l - u^l \quad (25)$$

$$\{c_1^l(v_m - v_1^l) - (v_m - v_0^l)\}X_m^l + \{c_2^l(v_m - v_2^l) - (v_m - v_0^l)\}Y_m^l + \{c_3^l(v_m - v_3^l) - (v_m - v_0^l)\}Z_m^l = v_0^l - v^l \quad (26)$$

are derived.

According to the principle of triangular surveying, the 3-D candidate coordinates 60b:

$(X_m^l, Y_m^l, Z_m^l)(m=1, \ldots )$, can be obtained by solving the simultaneous equations (23), (24), (25) and (26). The solution:

$(X_m^l, Y_m^l, Z_m^l)$ (m=1, ... ), of the simultaneous equations (23), (24), (25) and (26) can be obtained by means of method of least squares etc.

The 3-D candidate coordinates 60b:

$$(X_m^l, Y_m^l, Z_m^l) \ (m=1, \ldots),$$

obtained as above are sent to the 3-D coordinates determination unit 6, with the feature point coordinates 50a ($U^c$, $V^c$) attached thereto as a label.

Meanwhile, the 3-D coordinates calculation section 5c obtains the 3-D candidate coordinates 60c by the same method as the 3-D coordinates calculation section 5b, using the following parameters which are included in the parameters 400.

$$(u_i^c, v_i^c), (u_i^r, v_{ir})(i=0, \ldots, 3), c_j^c, C_j^r (j=1, \ldots, 3),$$

The obtained 3-D candidate coordinates 60c:

$$(X_n^r, Y_n^r, Z_n^r) \ (n=1, \ldots),$$

are sent to the 3-D coordinates determination unit 6, with the feature point coordinates 50a ($u^c$, $v^c$) attached thereto as a label.

The 3-D coordinates determination unit 6, which has been supplied with the 3-D candidate coordinates 60b and 60c from the 3-D coordinates calculation sections 5b and 5c, determines the genuine 3-D coordinates 700 using the 3-D candidate coordinates 60b and 60c which correspond to the same feature point 50a: ($U^c$, $V^c$).

In the following, the operation of the 3-D coordinates determination unit 6 will be described in detail. Referring to FIG. 6, the feature point 50a in the image 20a is in a one-to-one correspondence with a corresponding point 61 on the subject 22 in the 3-D coordinate system. Thus, a 3-D candidate point 60b which corresponds to a (2-D) candidate corresponding point 51b ($Q_m$: ($u_m$, $v_m$)) in the image 20b (Here, the candidate corresponding point 51b in the image 20b is a point which is considered to correspond to the feature point 50a in the image 20a.) and a 3-D candidate point 60c which corresponds to a (2-D) candidate corresponding point 51c in the image 20c (Here, the candidate corresponding point 51c in the image 20c is a point which is considered to correspond to the feature point 50a in the image 20a.) have to be the same point (i.e. the aforementioned corresponding point 61), and thus have to have almost the same 3-D coordinates. Therefore, for all the combinations of the 3-D candidate points 60b:

$$(X_m^l, Y_m^l, Z_m^l) \ (m=1, \ldots),$$

and the 3-D candidate points 60c:

$$(X_n^r, Y_n^r, Z_n^r)(n=1, \ldots),$$

, the following absolute norm $d_{mn}$:

$$d_{mn} = (X_m^l - X_n^r)^2 + (Y_m^l - Y_n^r)_2 + (Z_m^l - Z_n^r)^2 \quad (27)$$

or the following $L^2$ norm $d_{mn}$:

$$d_{mn} = |X_m^l - X_n^r| + |Y_m^l - Y_n^r| + |Z_m^l - Z_n^r| \quad (28)$$

is calculated. Here, the norm $d_{mn}$ represents the distance between the 3-D candidate point 60b and the 3-D candidate point 60c. Then, if the minimun value $d=d_{ij}$ (where $d_{ij}$=min ($d_{mn}$)) is not larger than a threshold value $\epsilon_2$, the feature point 50a: ($u^c$, $v^c$) is accepted and the 3-D coordinates (X, Y, Z) of the point 61 are determined as follows.

$$X = (X_1^l + X_j^r)/2 \quad (29)$$

$$Y = (Y_i^l + Y_j^r)/2 \quad (30)$$

$$Z = (Z_i^l + Z_j^r)/2 \quad (31)$$

And if the minimum value $d=d_{ij}$ is larger than the threshold value $\epsilon_2$, the feature point 50a: ($u^c$, $v^c$) is rejected or discarded as a point out of the subject. The above (preliminary) judgment using the threshold value $\epsilon_2$ is executed in order to reject feature points 50a which have not been picked up by all of the image pickup sections 1a, 1b and 1c.

After the determination by the 3-D coordinates determination unit 6, the genuine 3-D coordinates 700: (X, Y, Z) of the point 61 is outputted to the outline point extraction unit 7, with the feature point coordinates 50a ($u^c$, $v^c$) in the image 20a attached thereto as a label.

The outline point extraction unit 7 first executes judgment whether the feature point 50a is a point in the subject 22 or not, in which the outline point extraction unit 7 accepts the feature point 50a: ($u^c$, $v^c$) (which has been attached to the 3-D coordinates 700: (X, Y, Z) of the point 61) if the 3-D coordinates 700: (X, Y, Z) is within the confines of a designated 3-D space domain which has been preliminarily determined or which is designated on the spot by the operator. A plurality of feature points 50a: ($u^c$, $v^c$) and their 3-D coordinates 700: (X, Y, Z) are supplied to the outline point extraction unit 7 successively, and the outline point extraction unit 7 executes the above judgment (whether the feature point 50a: ($u^c$, $v^c$) can be accepted or not) successively. Then, from a plurality of feature points 50a which have been accepted by the outline point extraction unit 7 and which exist on a horizontal line (i.e. a plurality of accepted feature points 50a: ($u^c$, $v^c$) which have the same Y coordinate $v^c$), the outline point extraction unit 7 selects a left-hand feature point (a feature point 50a on the horizontal line whose X coordinate $u^c$ is the smallest) and a right-hand feature point (a feature point 50a on the horizontal line whose X coordinate $u^c$ is the largest), and sends the left-hand feature points and the right-hand feature points corresponding to each Y coordinate $v^c$ into the subject display unit 8 as the subject outline point coordinates 800.

Then, the subject display unit 8 displays part of the main image 20a which is surrounded by the subject outline point coordinates 800 (i.e. part of the image 20a between the left-hand feature points and the right-hand feature points corresponding to each Y coordinate $V^c$), thereby the image of the subject 22 is extracted from the main image 20a and displayed on the subject display unit 8.

As described above, in the first embodiment, the main image picking section 1a and the subsidiary image picking sections 1b and 1c are used to shoot the subject, and images 10a, 10b and 10c of the 3-D object 21 on which a predetermined pattern is drawn are also picked up by the image picking sections 1a, 1b and 1c in order to obtain parameters 400 which represent relative positions and attitudes of the image pickup sections 1a, 1b and 1c. In the embodiment, 11 parameters per one image pickup section (generally known to be enough for expressing relative positions and attitudes of a plurality of image pickup sections) are obtained by the parameter calculation unit 4. From the images 20a, 20b and 20c in which the subject 22 has been picked up, the feature points 50a, 50b and 50c are extracted by the feature point extraction unit 3, and the genuine 3-D coordinates 700 corresponding to each feature point 50a in the main image 20a are obtained by the 3-D coordinates calculation unit 5 and the 3-D coordinates determination unit 6 using the parameters 400 and the feature points 50b and 50c. In the outline point extraction unit 7, judgment whether each feature point 50a is a point in the subject 22 or not is executed using the 3-D coordinates 700 corresponding to the feature point 50a, in which a feature point 50a is accepted if the 3-D coordinates 700 corresponding to the feature point 50a is within the confines of a designated 3-D space domain which has been preliminarily determined or which is designated on the spot by the operator, and otherwise, the feature point 50a is rejected as not a point in the subject 22, and the subject outline point coordinates 800 are extracted from a plurality of feature points 50a which have been accepted. Then, part of the main image 20a which is surrounded by the subject outline point coordinates 800 is extracted and displayed by the subject display unit 8, thereby the subject image extraction from the main image 20a is completed.

Therefore, according to the first embodiment, an image of a desired subject can be extracted from the main image 20a, using the 3-D coordinates calculated for each extracted feature point 50a and executing the judgment with regard to the designated 3-D space domain which has been preliminarily determined or which is designated on the spot by the operator, without needing preparation of the information concerning the subject or the image pickup devices.

Further, according to the first embodiment, subject image extraction can be executed with easy setting of a threshold value for distinguishing between the background and the foreground, since 3-D coordinates corresponding to a feature point 50a in the image 20a are automatically calculated using the parameters 400 etc. and the operator of the device can set the threshold value by measurable value such as distance or by designating the 3-D space domain.

Further, according to the first embodiment, subject image extraction can be executed without needing precise control or measurement of the positions and attitudes of the image pickup devices, since the parameters 400 representing relative positions and attitudes of the image pickup sections 1a, 1b and 1c can be automatically obtained using the images 10a, 10b and 10c of the 3-D object 21 on which a predetermined pattern is drawn.

Further, according to the first embodiment, accuracy of subject image extraction can be remarkably improved, since the 3-D coordinates 700 which correspond to each extracted feature point 50a in the main image 20a can be accurately obtained using the parameters 400 calculated from the images 10a, 10b, 10c picked up by the image pickup sections 1a. 1b and 1c, and the feature points 50b and 50c extracted from the subsidiary images 20b and 20c. The accuracy of subject image extraction is increased with a synergistic effect by the extraction of the feature points 50a, 50b and 50c from the aforementioned edge-like parts of the images 20a, 20b and 20c and by the accurate calculation of the genuine 3-D coordinates 700 and by the designation of the designated 3-D space domain.

Incidentally, although three image pickup sections (i.e. one main image pickup section 1a and two subsidiary image pickup sections 1b and 1c) were used in the image pickup unit 1 in the above embodiment, it is also possible to use four or more image pickup sections (i.e. three or more subsidiary image pickup sections). In the case where N pieces of subsidiary image pickup sections are used, N+1 pieces of image storage sections, N+1 pieces of feature point extraction sections, and N pieces of 3-D coordinates calculation sections are used. In this case, (N+1)×11 parameters (i.e. 11 parameters per image pickup sections) are calculated by the parameter calculation unit 4 and N groups of 3-D candidate coordinates (60b, 60c, . . . ) are obtained by the 3-D coordinates calculation unit 5, and in the 3-D coordinates determination unit 6, the sum of norms $d_{mn}$ (with regard to every pair of subsidiary images) are used instead of the norm $d_{mn}$ of the equation (27) or (28), and the averages in the equations (29) through (31) are replaced by averages divided by N (not by 2).

Figure 8:
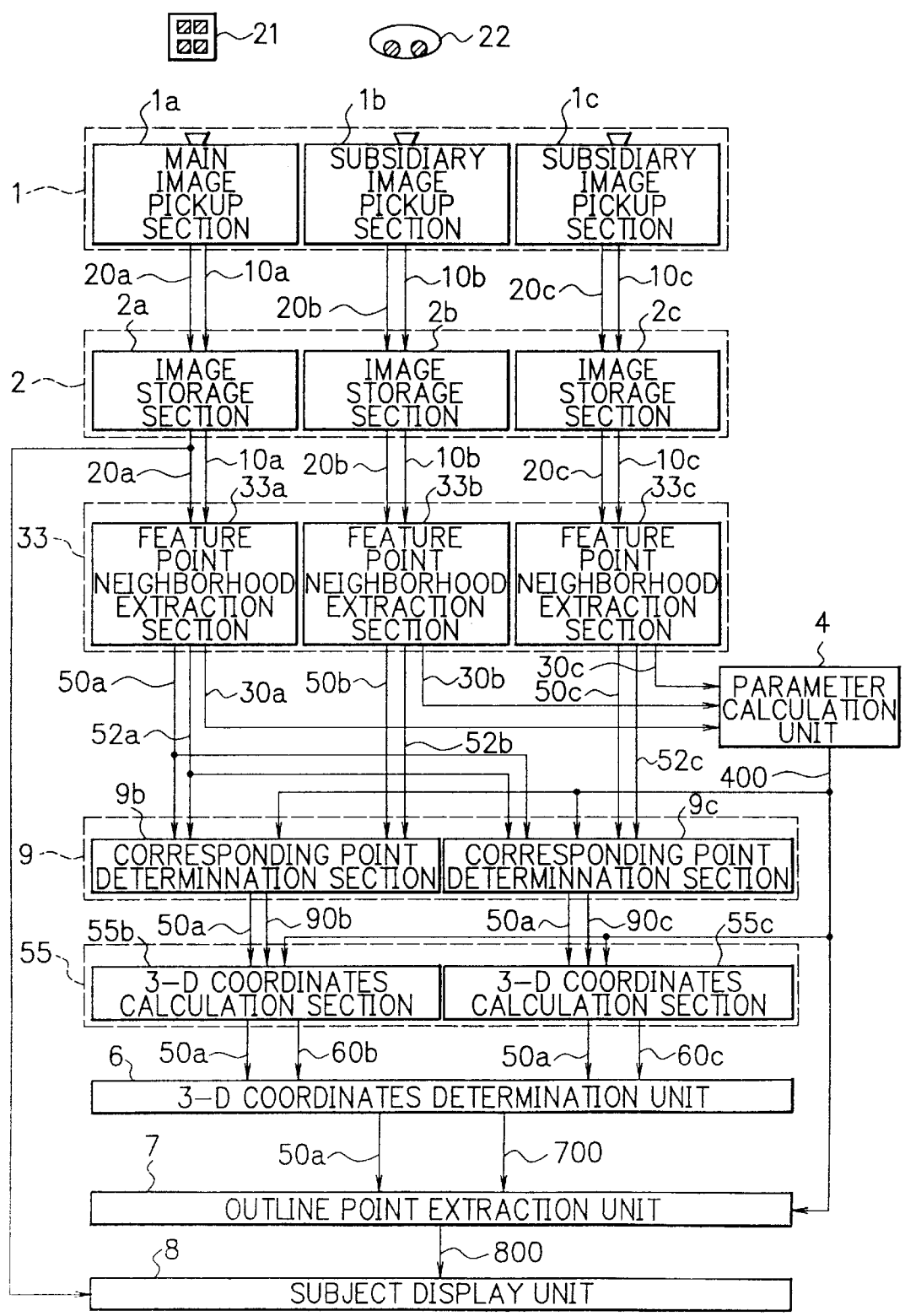
FIG. 8 is a block diagram showing a subject image extraction device according to another embodiment of the present invention.

FIG. 8 is a block diagram showing a subject image extraction device according to the second embodiment of the present invention.

The subject image extraction device of FIG. 8 comprises an image pickup unit 1, an image storage unit 2, a feature point neighborhood extraction unit 33, a parameter calculation unit 4, a corresponding point determination unit 9, a 3-D coordinates calculation unit 55, a 3-D coordinates determination unit 6, an outline point extraction unit 7, and a subject display unit 8.

The image pickup unit 1 is composed of an image pickup section 1a for picking up the main image to be mainly used in the subject image extraction process, and image pickup sections 1b and 1c for picking up subsidiary images to be referred to in the subject image extraction process. The image pickup sections 1a, 1b and 1c are preliminarily used to shoot a 3-D object 21 on which a predetermined pattern is drawn in order to obtain the parameters 400, and are used to shoot a subject 22 whose image will be extracted using the parameters 400 etc.

The image storage unit 2 is composed of image storage sections 2a, 2b and 2c. The image storage sections 2a, 2b and 2c store images 10a, 10b and 10c of the 3-D object 21 and images 20a, 20b and 20c of the subject 22 which have been picked up by the image pickup sections 1a, 1b and 1c, respectively.

The feature point neighborhood extraction unit 33 is composed of feature point neighborhood extraction sections 33a, 33b and 33c. The feature point neighborhood extraction sections 33a, 33b and 33c extract coordinates 30a, 30b and 30c of a plurality of feature points from the images 10a, 10b and 10c which have been stored in the image storage sections 2a, 2b and 2c respectively, and extract coordinates 50a, 50b and 50c of a plurality of feature points from the images 20a, 20b and 20c which have been stored in the image storage sections 2a, 2b and 2c respectively, and further extract color/luminance information 52a, 52b and 52c of pixels in the neighborhood of the feature points 50a, 50b and 50c respectively.

The parameter calculation unit 4 calculates and stores the parameters 400 which represent relative positions and attitudes of the main image pickup section 1a and the subsidiary image pickup sections 1b and 1c, using the feature point coordinates 30a, 30b and 30c which have been extracted by the feature point extraction sections 3a, 3b and 3c respectively.

The corresponding point determination unit 9 is composed of corresponding point determination sections 9b and 9c. The corresponding point determination section 9b selects a group of candidate corresponding points 90b in the image 20b (points in the image 20b which are considered to correspond to the feature point 50a in the image 20a) from the feature points 50b, using the feature points 50a and 50b and the color/luminance information 52a and 52b of pixels in the neighborhood of the feature points 50a and 50b which have been extracted by the feature point neighborhood extraction sections 33a and 33b and using the parameters 400. The corresponding point determination section 9c selects a group of candidate corresponding points 90c in the image 20c (points in the image 20c which are considered to correspond to the feature point 50a in the image 20a) from the feature points 50c, using the feature points 50a and 50c and the color/luminance information 52a and 52c of pixels in the neighborhood of the feature points 50a and 50c which have been extracted by the feature point neighborhood extraction sections 33a and 33c and using the parameters 400.

The 3-D coordinates calculation unit 55 is composed of 3-D coordinates calculation sections 55b and 55c. The 3-D coordinates calculation section 55b calculates 3-D candidate coordinates 60b using the feature point 50a which has been extracted by the feature point neighborhood extraction section 33a, the candidate corresponding points 90b which have been selected by the corresponding point determination section 9b, and the parameters 400. The 3-D coordinates calculation section 55c calculates 3-D candidate coordinates 60c using the feature point 50a which has been extracted by the feature point neighborhood extraction section 33a, the candidate corresponding points 90c which have been selected by the corresponding point determination section 9c, and the parameters 400.

The 3-D coordinates determination unit 6 determines genuine 3-D coordinates 700 which correspond to the feature point coordinates 50a in the main image 20a, using the 3-D candidate coordinates 60b and the 3-D candidate coordinates 60c.

The outline point extraction unit 7 judges whether the feature point 50a is a point in the subject 22 or not, using the 3-D coordinates 700, and extracts subject outline point coordinates 800.

The subject display unit 8 displays part of the image 20a which are surrounded by the subject outline points, using the subject outline point coordinates 800 extracted by the outline point extraction unit 7.

In the following, the operations of the corresponding point determination unit 9 (which has been newly introduced into the second embodiment) and the feature point neighborhood extraction unit 33 and the 3-D coordinates calculation unit 55 (whose operations have been modified in the second embodiment) will be described in detail. The operations of the other blocks in FIG. 8 is the same as those of the first embodiment.

First, the operation of the feature point neighborhood extraction unit 33 will be described. When the images 10a, 10b and 10c of the 3-D object 21 on which the predetermined pattern is drawn are supplied to the feature point neighborhood extraction unit 33, the feature point neighborhood extraction sections 33a, 33b and 33c operate in the same way as the feature point extraction sections 3a, 3b and 3c of the first embodiment and extract the coordinates 30a, 30b and 30c of a plurality of feature points from the images 10a, 10b and 10c and output the feature point coordinates 30a, 30b and 30c to the parameter calculation unit 4, respectively. When the images 20a, 20b and 20c of the subject 22 are supplied to the feature point neighborhood extraction unit 33, the feature point neighborhood extraction sections 33a, 33b and 33c extract the feature points 50a, 50b and 50c respectively in the same way as the feature point extraction sections 3a, 3b and 3c of the first embodiment, and further extract color/luminance information (color intensity information in the case of color images or luminance information in the case of black and white images) 52a, 52b and 52c of pixels in the neighborhood of the feature points 50a, 50b and 50c respectively. The neighborhood can be defined in various ways, however, a rectangle whose center is on the feature point is generally used for the neighborhood.

Next, the operation of the corresponding point determination unit 9 will be described. The corresponding point determination section 9b in the corresponding point determination unit 9 extracts candidate corresponding points 5b (i.e. the $Q_m$: $(u_m, v_m)$ (m=1, . . . ) which are obtained by the aforementioned inequality (22)) in the image 20b which corresponds to the feature point 50a by calculating the epipolar line in the same way as the 3-D coordinates calculation section 5b of the first embodiment. Subsequently, the corresponding point determination section 9b executes block matching, which is known as an image processing technique, between the color/luminance information 52a of the pixels in the neighborhood of the feature point 50a and the color/luminance information 52b of the pixels in the neighborhood of a candidate corresponding point 51b. FIG. 7 is a schematic diagram explaining the block matching. In the block matching between the color/luminance information 52a and 52b, two blocks of the same size respectively including the feature point 50a and the candidate corresponding point 51b are formed first, and comparison of the color/luminance between two corresponding points in the two blocks is executed. Then, the difference of the color/luminance is added up with respect to each point in the blocks (The sum is referred to as a matching error.). If the matching error is larger than a predetermined threshold value, the candidate corresponding point 51b is rejected as an inadequate point (a point not corresponding to the feature point 50a). After the rejection by the block matching, a group of candidate corresponding points 90b from which the inadequate points have been removed is sent to the 3-D coordinates calculation section 55b in the 3-D coordinates calculation unit 55. At this point, the candidate corresponding points 90b have been screened by the block matching, and the number of the candidate corresponding points 90b have been considerably reduced due to the block matching. Meanwhile, the corresponding point determination section 9c determines a group of candidate corresponding points 90c in the same way as the corresponding point determination section 9b, and sends the group of candidate corresponding points 90c to the 3-D coordinates calculation section 55c in the 3-D coordinates calculation unit 55. Incidentally, although the above corresponding point determination unit 9 used the parameters 400 for calculating the epipolar line and obtaining the candidate corresponding points, it is also possible to obtain candidate corresponding points without using the parameters 400.

Lastly, the operation of the 3-D coordinates calculation unit 55 will be described. The 3-D coordinates calculation section 55b in the 3-D coordinates calculation unit 55 obtains almost all 3-D candidate coordinates 60b by the same operation as the 3-D coordinates calculation section 5b of the first embodiment. However, in the second embodiment, the candidate corresponding points 90b have been already obtained by the corresponding point determination section 9b, therefore the 3-D coordinates calculation section 55b does not calculate the candidate corresponding points $Q_m$: $(u_m, v_m)$ (m=1, . . . ) and uses the candidate corresponding points 90b supplied by the corresponding point determination section 9b.

As described above, according to the second embodiment, as well as the same effects as those of the first embodiment, screening of corresponding points is preliminarily executed by the corresponding point determination unit 9 by means of the block matching, and thus accuracy of calculation and determination of the 3-D coordinates which correspond to the feature point 50a can be further improved, and calculation time for the 3-D coordinates (which was the major portion of calculation time of the subject image extraction device) can be considerably shortened.

As set forth hereinbefore by the subject image extraction device according to the present invention, an image of a desired subject can be extracted from an inputted image with high accuracy, without needing preparation of the information concerning the subject or the image pickup devices, without needing precise control or measurement of the positions and attitudes of the image pickup devices, and with easy setting of a threshold value for distinguishing between the background and the foreground.

The subject image extraction devices which have been described referring to FIG. 1 and FIG. 8 can be applied to reduction of the amount of data which is transmitted between video phone etc. In the case of video phone, a speaker talking near the video phone (i.e. in the designated 3-D space domain) can be extracted as the subject from an image, and the image of the speaker only can be encoded and transmitted, thereby the amount of data can be considerably reduced, performance of video phone can be improved, and privacy of speakers can be protected.

Incidentally, although the subject image extraction devices of FIG. 1 and FIG. 8 included the image pickup unit 1, subject image extraction can of course be executed by a subject image extraction devices which is not provided with the image pickup unit 1 as long as images of a 3-D object and images including a subject which have been picked up by three or more image pickup sections (devices) are supplied. Therefore, subject image extraction devices according to the present invention without image pickup units are also possible. Similarly, subject image extraction devices according to the present invention for subject image extraction only (i.e. not for displaying the extracted subject image) are also possible. Description of such subject image extraction devices is omitted for brevity.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A subject image extraction device comprising:

an image storage means including main image storage section for storing images which have been picked up by a main image pickup section for picking up a main image from which an image of a subject is extracted, and two or more subsidiary image storage sections for storing images which have been picked up by two or more subsidiary image pickup sections for picking up subsidiary images to be referred to in subject image extraction;

a feature point extraction means including three or more feature point extraction sections for extracting feature point coordinates in the images which have been stored in each of the image storage sections;

a parameter calculation means for calculating parameters which represent relative positions and attitudes of the main image pickup section and the subsidiary image pickup sections, using the feature point coordinates in the images of a 3-D object on which a predetermined pattern is drawn which have been picked up by the main image pickup section and the subsidiary image pickup sections;

a 3-D coordinates calculation means including two or more 3-D coordinates calculation sections for calculating candidate 3-D coordinates which are considered to correspond to the feature point coordinates of a feature point in the main image, using the feature point coordinates in the main image, the feature point coordinates in the subsidiary images, and the parameters obtained by the parameter calculation means;

a 3-D coordinates determination means for determining genuine 3-D coordinates which correspond to the feature point in the main image, using the candidate 3-D coordinates calculated by the 3-D coordinates calculation sections in the 3-D coordinates calculation means;

a judgment means for judging whether or not the genuine 3-D coordinates corresponding to the feature point in the main image is in a designated 3-D space domain, and accepting the feature point if the genuine 3-D coordinates corresponding to the feature point is judged to be in the designated 3-D space domain;

an outline point extraction means for extracting subject outline points from a plurality of feature points which have been accepted by the judgment means; and a subject extraction means for extracting part of the main image which is surrounded by the subject outline points as the subject image.

2. A subject image extraction device as claimed in claim 1, wherein the feature point extraction sections in the feature point extraction means extract edge-like parts in the images where sudden changes occur in color intensity or luminance as the feature point coordinates, in the extraction of the feature point coordinates from the main image or the subsidiary images.

3. A subject image extraction device as claimed in claim 1, wherein the parameter calculation means calculates eleven or more parameters per one image pickup section.

4. A subject image extraction device as claimed in claim 1, wherein the 3-D coordinates determination means determines the genuine 3-D coordinates by selecting a group of 3-D coordinates from each of the candidate 3-D coordinates calculated by each of the 3-D coordinates calculation sections so that the sum of distances between the 3-D coordinates included in the group will become the smallest and defining the genuine 3-D coordinates by the average of the 3-D coordinates included in the group.

5. A subject image extraction device as claimed in claim 1, further comprising an image pickup means including the main image pickup section and the two or more subsidiary image pickup sections.

6. A subject image extraction device as claimed in claim 1, further comprising a subject display means for displaying the part of the main image which has been extracted by the subject extraction means.

7. A subject image extraction device as claimed in claim 1, wherein the number of the image pickup sections is three.

8. A subject image extraction device comprising:

an image storage means including main image storage section for storing images which have been picked up by a main image pickup section for picking up a main image from which an image of a subject is extracted, and two or more subsidiary image storage sections for storing images which have been picked up by two or more subsidiary image pickup sections for picking up subsidiary images to be referred to in subject image extraction;

to a feature point neighborhood extraction means including three or more feature point neighborhood extraction sections for extracting feature point coordinates in the images which have been stored in each of the image storage sections and extracting color/luminance information of pixels in the neighborhood of the feature point coordinates;

a parameter calculation means for calculating parameters which represent relative positions and attitudes of the main image pickup section and the subsidiary image pickup sections, using the feature point coordinates in the images of a 3-D object on which a predetermined pattern is drawn which have been picked up by the main image pickup section and the subsidiary image pickup sections;

a corresponding point determination means including two or more corresponding point determination sections for selecting a group of candidate corresponding points in the subsidiary image which are considered to correspond to the feature point in the main image, from the feature points in the subsidiary images, using the feature point coordinates in the main image and the subsidiary image and the color/luminance information of pixels in the neighborhood of the feature point coordinates which have been extracted by the feature point neighborhood extraction means;

a 3-D coordinates calculation means including two or more 3-D coordinates calculation sections for calculating candidate 3-D coordinates which are considered to correspond to a feature point in the main image, using the feature point coordinates in the main image, the group of candidate corresponding points, and the parameters obtained by the parameter calculation means;

a 3-D coordinates determination means for determining genuine 3-D coordinates which correspond to the feature point in the main image, using the candidate 3-D coordinates calculated by the 3-D coordinates calculation sections in the 3-D coordinates calculation means;

a judgment means for judging whether or not the genuine 3-D coordinates corresponding to the feature point in the main image is in a designated 3-D space domain, and accepting the feature point if the genuine 3-D coordinates corresponding to the feature point is judged to be in the designated 3-D space domain;

an outline point extraction means for extracting subject outline points from a plurality of feature points which have been accepted by the judgment means; and a subject extraction means for extracting part of the main image which is surrounded by the subject outline points.

9. A subject image extraction device as claimed in claim 8, wherein the feature point neighborhood extraction sections in the feature point extraction means extract edge-like parts in the images where sudden changes occur in color intensity or luminance as the feature point coordinates, in the extraction of the feature point coordinates from the main image or the subsidiary images.

10. A subject image extraction device as claimed in claim 8, wherein the parameter calculation means calculates eleven or more parameters per one image pickup section.

11. A subject image extraction device as claimed in claim 8, wherein the 3-D coordinates determination means determines the genuine 3-D coordinates by selecting a group of 3-D coordinates from each of the candidate 3-D coordinates calculated by each of the 3-D coordinates calculation sections so that the sum of distances between the 3-D coordinates included in the group will become the smallest and defining the genuine 3-D coordinates by the average of the 3-D coordinates included in the group.

12. A subject image extraction device as claimed in claim 8, further comprising an image pickup means including the main image pickup section and the two or more subsidiary image pickup sections.

13. A subject image extraction device as claimed in claim 8, further comprising a subject display means for displaying the part of the main image which has been extracted by the subject extraction means.

14. A subject image extraction device as claimed in claim 8, wherein the number of the image pickup sections is three.

* * * * *